C. CHINNOCK.
BEER MEASURE.

No. 34,943. Patented Apr. 15, 1862.

UNITED STATES PATENT OFFICE.

C. CHINNOCK, OF BROOKLYN, NEW YORK.

BEER-MEASURE.

Specification of Letters Patent No. 34,943, dated April 15, 1862.

*To all whom it may concern:*

Be it known that I, CHARLES CHINNOCK, of the city of Brooklyn, in Kings county and State of New York, have invented a new and improved can and measure for liquids liable to froth or foam when drawn or measured and also to separate the froth or foam from the liquid when pouring into other vessel or vessels; and I do hereby declare that the following is a full and exact description thereof, reference being had to the accompanying drawings, and to the letters and figures of reference marked thereon, making a part of this specification, viz:

Figure 1:
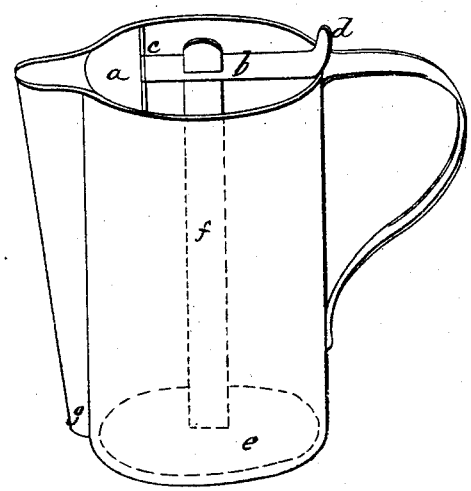
Figure 1, represents the can or measure complete, the spout having strainer holes at $g$ as in an ordinary coffee pot. The can or measure is partially covered in front at $a$, to this cover is attached joint turning at $c$, to lift $b$, by handle $d$, to release float $e$, with gage $f$, when to be removed.
Figure 2:
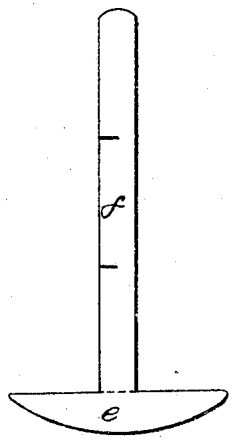
Fig. 2, is a section of the float $e$, to separate the foam from the liquid, attached to which is the upright bar $f$, which has the gage or scale marked upon it and also serves to keep the float in position.

Previous to my invention other separators and measures have been constructed, but it may be seen that this invention applies only to the float $e$ Fig. 2 and the sliding bar and scale $f$. When used the liquid liable to foam is drawn into the open space at either side of $b$ between $a$ and $d$. The float $e$ is too heavy to be raised by the foam, consequently $e$ floating on the liquid separates the foam from the liquid. As the liquid flows into the can, $e$ of course floats and rising lifts $f$ through the slot in $b$, and as the gage is marked on $f$ shows the actual liquid under the float and foam above.

This measure is supposed to be made one third larger than the ordinary ones that the foam may be all saved for condensation.

I do not claim to be the first inventor of a can or measure for measuring frothing liquids or separating the liquid from the foam; but

What I claim as my invention and desire to secure by Letters Patent, is—

1. The use of a float to separate the liquid from the foam in combination with a beer measure, substantially as described.

2. The application of an index to the float, in the same combination, by which the quantity of liquid in the can is accurately indicated and measured independent of the froth.

In testimony whereof I have hereunto subscribed my name.

CHARLES CHINNOCK.

Witnesses:
   J. LITTLE HYDE,
   EUGENE VAN BENSCHOLIN.